United States Patent [19]

Kurami et al.

[11] Patent Number: 5,081,585
[45] Date of Patent: Jan. 14, 1992

[54] CONTROL SYSTEM FOR AUTONOMOUS AUTOMOTIVE VEHICLE OR THE LIKE

[75] Inventors: Kunihiko Kurami, Kawasaki; Norimasa Kishi, Yokohama; Kazunori Noso, Yokohama; Akira Hattori, Yokohama, all of Japan

[73] Assignee: Nissan Motor Company, Ltd.

[21] Appl. No.: 208,313

[22] Filed: Jun. 15, 1988

[30] Foreign Application Priority Data

Jun. 17, 1987 [JP] Japan ............................. 62-150455

[51] Int. Cl.[5] ................................... G06F 15/50
[52] U.S. Cl. ........................... 364/424.02; 180/168; 318/587; 358/103
[58] Field of Search .............. 364/424.02, 426.01, 364/443, 449, 456, 571.01; 358/103; 180/167, 168; 318/587

[56] References Cited

U.S. PATENT DOCUMENTS

| | | | |
|---|---|---|---|
| 4,533,998 | 8/1985 | Falamak | 180/168 |
| 4,566,032 | 1/1986 | Hirooka et al. | 364/424.02 |
| 4,628,453 | 12/1986 | Kamejima et al. | 364/424.82 |
| 4,630,109 | 12/1986 | Barton | 364/424.92 |
| 4,703,429 | 10/1987 | Sakata | 364/426.04 |
| 4,734,863 | 3/1988 | Honey et al. | 364/449 |
| 4,786,164 | 11/1988 | Kawata | 180/168 |
| 4,809,178 | 2/1989 | Ninomiya et al. | 364/443 |

Primary Examiner—Parshotam S. Lall
Assistant Examiner—V. Trans
Attorney, Agent, or Firm—Lowe, Price, LeBlanc & Becker

[57] ABSTRACT

An image processing section receives data from cameras mounted on the vehicle and produces an image or images from which a first set of so called "local" data is derived and compiled. A sensor section senses the rotational characteristics of two vehicle wheels and the conditions prevailing on either side of the vehicle and complies a second set of so called "global" data. The local and global data are compared and data is only accepted in the event that the differences between the two sets of data fall within predetermined limits and data which falls outside of the ranges deemed erroneous and rejected.

20 Claims, 3 Drawing Sheets

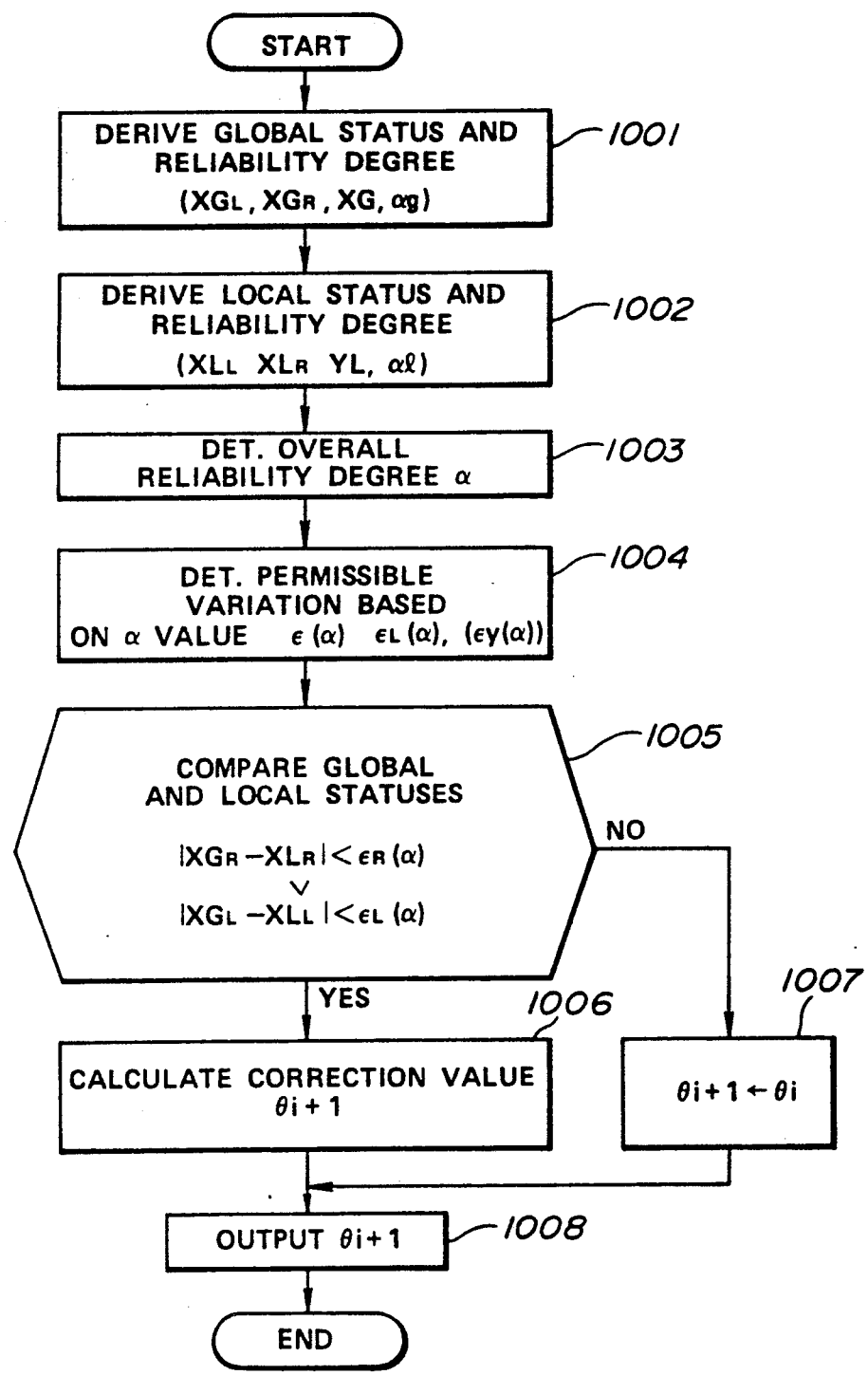

CONTROL SYSTEM FOR AUTONOMOUS AUTOMOTIVE VEHICLE OR THE LIKE

BACKGROUND OF THE INVENTION

1. Field of the Invention

The present invention relates generally to an autonomous control system for an automotive vehicle or the like and more specifically to a such a system which improves the reliability with which the vehicle can be automatically controlled.

2. Description of the Prior Art

Autonomous vehicular control systems proposed hitherto have attempted to guide the vehicle based on data derived by scanning the road centerline or the like predetermined indication which extends along the road on which the vehicle is running. Based on the data derived by observing the centerline (for example) these control systems have predicted the presence of curves in the road and suitably controlled the steering, brakes accelerator etc.

However, these systems have lacked sufficient reliability to enable a totally unmanned completely autonomously controlled vehicle to safely left to execute its work and/or navigate a given course without some form of human supervision or monitoring.

SUMMARY OF THE INVENTION

It is an object of the present invention to provide an autonomous control system for an automotive vehicle or the like which system exhibits a level of reliability which enables an unmanned vehicle to be left to execute various tasks and or navigate a predetermined course without the need of human supervision.

In brief, the above object is achieve by an arrangement wherein an image processing section receives data from cameras mounted on the vehicle and produces an image or images from which a first set of so called "local" data is derived and compiled. A sensor section senses the rotational characteristics of two vehicle wheels and the conditions prevailing on either side of the vehicle and complies a second set of so called "global" data. The local and global data are compared and data is only accepted in the event that the differences between the two sets of data fall within predetermined limits and data which falls outside of the ranges deemed erroneous and rejected.

More specifically, a first aspect of the present invention comes in the form of a method of autonomously controlling a vehicle, the method featuring the steps of: producing an image of the road on which the vehicle is running; deriving a first set of vehicle positional data from the image; sensing the rotational characteristics of a vehicle wheel; deriving a second set of vehicle positional data from the wheel rotational characteristics; comparing the first and second sets of data and determining if the difference between the two sets fall within a predetermined range; and accepting the data only if the difference falls in the predetermined range.

A second aspect of the present invention takes the form of the steps of producing an image of the road on which the vehicle is running and deriving the first set of positional data comprising: observing the road using first and second cameras; producing a stereo image using the inputs from the first and second cameras; producing an image of the road; identifying first, second and third road features from the image, the first second and third road features relating to the position of the vehicle on the road; establishing the distance of the vehicle from each of the first, second and third road features; and using the distances derived in the step of establishing to compile the first set of vehicle position data.

A third aspect of the present invention comes in that the vehicle wheel rotational characterstic sensing step and the step of deriving the second set of vehicle positional data comprise: measuring the rotational speed of first and second wheels of the vehicle; determining the vehicle speed, distance traversed and the rate of turning of the vehicle using the rotational speeds of the first and second wheels; and using the vehicle speed, distance traversed and .rate of turning of the vehicle to compile the second set of positional data.

A fourth aspect of the present invention comes in the form of an autonomously controlled vehicle which vehicle features means for producing an image of the road on which the vehicle is running; means for deriving a first set of vehicle positional data from the image; means for sensing the rotational characteristics of a vehicle wheel; means for deriving a second set of vehicle positional data from the wheel data and determining if the difference between the two sets fall within a predetermined range, and accepting the data only if the difference falls in the predetermined range.

Another aspect of the present invention comes in a vehicle which features: a system for autonomously controlling the vehicle, the system comprising: an image processing section, the image processing section being arranged to observe the road, produce an image of the same, and derive distance related data from the image; a first positional data determining section, the first positional determining section compiling a first set of vehicle positional data; a sensor section, the sensor section sensing the rotational speed of first and second road wheels and the conditions prevailing on either side of the vehicle, the sensor section including a second positional data determining section which complies a second set of vehicle positional data; an actuator control section, the actuator control section including a plurality of actuators and a control unit for selectively controlling the same, the plurality of actuators being arranged to control the steering, power generation and braking operations of the vehicle; a man-machine interface, the man-machine interface being arranged to receive external commands; and a control section, the control section being responsive to the first and second data compilations in the first and second positional data determining sections, the sensor section, and the man-machine interface, and arranged to selectively control the actuator section, the control section including means for: comparing the first and second sets of data and determining if the difference between the two sets fall within a predetermined range; and accepting the data only if the difference falls in the predetermined range.

A yet further aspect of the invention comes in that the vehicle further comprises: a navigation section, the navigation system including a memory in which map data is stored and an access section which selectively acesses the memory; the control section being operatively connected with the navigation system in manner to enable a requisite course to be plotted and for the instant position of the vehicle to be identified.

BRIEF DESCRIPTION OF THE DRAWINGS

FIG. 4 is a flow chart showing the operations which characterize the present invention.

DETAILED DESCRIPTION OF THE PREFERRED EMBODIMENTS

Figure 1:
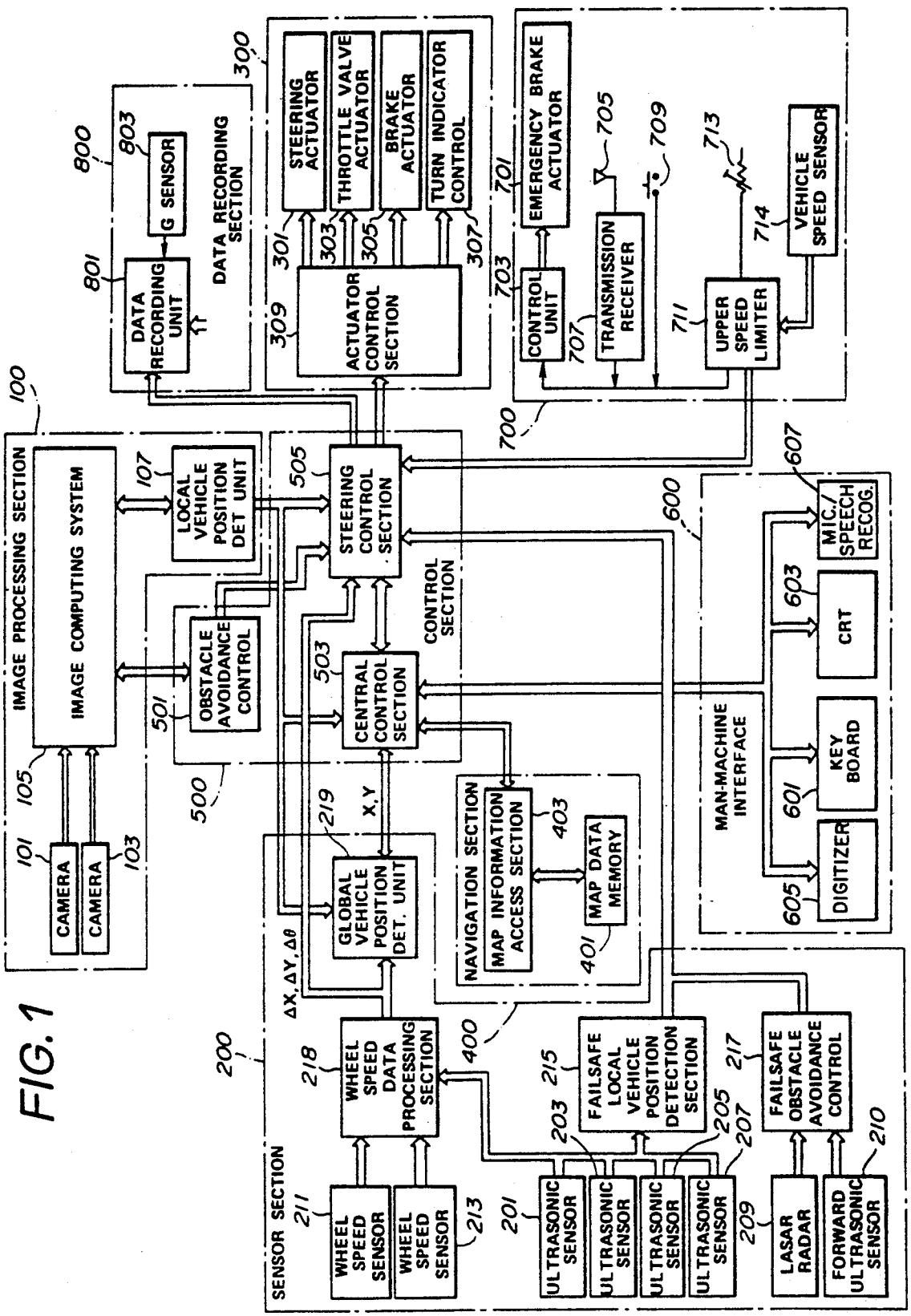
FIG. 1 shows in block diagram an embodiment of the control system according to the present invention.

FIG. 1 shows in block diagram form a system which embodies the present invention. This system includes an image processing section 100 which includes two or more cameras or the like sensors for observing the road on which the vehicle is running; a sensor section 200 equipped with ultrasonic sensors and/or a lasar radar which are arranged to probe the regions located in front of, on the sides of and to the rear of the vehicle; an actuator control section 300 which is arranged to control the operation of vehicle steering, engine power output, the application of the vehicle brakes and the vehicle turn indicators; a navigation section 400 which includes memorized map data and which supplies information relating to the location of the vehicle to a central control section 500. In the instant system the latter mentioned section (500) functions to, based on a number of inputs, plan a course of action and subsequently derive a series of control commands and outputs the same to the above mentioned actuactor control section 300 and other sections which will be mentioned hereinlater.

The arrangement further includes a man-machine interface section 600; a vehicle speed control section 700 which among other things limits the upper speed the vehicle can be permitted to attain; and a data recording section 800 which functions to record all of the vehicle operations in a manner similar to an air-craft "flight" recorder.

More specifically, the image processing section 100 includes a pair of cameras 101, 103 which are arranged at the front of the vehicle, for example at the front left and right corners of the same so as to enable the development of a stero image. To increase the angle over which data can be collected, the cameras 101, 103 can be arranged to pivotal and to sweep from side to side. The cameras 101 and 103 in this instance are operatively connected with an image computing system 105 which is capable of converting the inputs therefrom into a planar image (or, and/or a three dimensional image or images). This image (or images) are used to determine the presence or absence of an obstacle in the path of the vehicle.

In addition to this, the image computing system 105 can be arranged to develop an image of which is on the road ahead of the vehicle in a manner depicts the position of the white center line and the road edge. Based on this image, data relating to the distance XL from the center of the vehicle to the left hand side of the road and the distance XR to the center line (or a similar reference), can be suitably derived. Further, the change in angle (theta) in the center line (for example) can be used to determine the presence or absence of a curve in the road and the magnitude thereof.

The distance Y from the center of the vehicle to an approaching intersection can be approximated by detecting the disappearance of the center line.

The above mentioned data XL, XR, Theta and Y constitutes what shall be referred to as "local" vehicle position or status related data.

In the instant system the sensor section 200 includes ultrasonic and lasar radar type sensors. These sensors are arranged to sense the presence of other vehicles, guard rails on the side of the road and the like obstacles. In this instance these sensors are arranged so as to provide sufficient data as to enable the vehicle to proceed even in the absence of the data inputted via the image processing section and thus defines a back- up or failsafe arrangement which can compensate for the malfuction of the image processing section.

More specfically, in the instant system ultrasonic sensors 201, 203, 204, and 205 are arranged to be sense conditions prevailing ahead of, behind and on either side of the vehicle. For example, with these sensors it is possible to sense the guard rail at the side of the road and to develop the equivalent of XL, XR and Theta data independently of that provided by the cameras 101 and 103.

Further, by sensing the disapperance of the guard rails it is possible to predict the approach of an intersection located T meters ahead.

The sensing section 200 further includes a lasar radar 109 and a forward ultrasonic sensor 210. The inputs from these sensors also provided back-up or failsafe information which complements obstacle avoidance data provided by the camers by independently detecting the presence of obstacles in the path of the vehicle and with which the vehicle is apt to collide. This data can be used to induce the necessary steering, stoppage or speed reduction of the vehicle if required.

Wheel speed sensors 211 and 213 are provided and used to provide Y and theta related data which can used in combination with the data inputted by the other sensors of the sensor section 200 in a manner which permits data accuracy varification as will become more apparent hereinlater. The inputs of the wheel speed sensors 211, 213 are collected in a wheel speed data processing section 218 and used in conjunction with X related data from the sensor battery including ultrasonic sensors 201–207 to develop and compile the above mentioned global data in unit 219.

By way of example, the wheel speed sensors can be arranged to generate from 1000 to 4000 pulses per wheel rotation. Thus, the difference between the wheel speed inputs can be used to ascertain whether the vehicle is traversing a curve or proceeding in a straight line and can be used when comparing and/or developing data relating to the changes in the X , Y and Theta.

As will be appreciated it is important to ensure that the minimum amount of incorrect or erroneous values are developed as the acculmulation of such errors has a large influence on the development and validity of the global data.

The actuator section 300 contains a plurality of actuators which replace the control normally provided by a human operator. Viz., this section includes a steering actuator 301, a throttle valve actuator 303 which replaces the input normally provided through the accelerator pedal, a brake actuator 305 and a turn indicator controller 307. Of course the present invention is not limited to the above listed elements and other actuators can be provided as desired. By way of example only it is possible to provide a light sensor which detects the amount of light available and a circuit or actuator which can selectively switch on the lights of the vehicle in dark environments and thus assist the image processing section in accurately observing the road and surrounding conditions. Another actuator which sounds the vehicle horn can be provided and arranged to be responsive to the control section in manner to suitably sound an alarm signal in the event that the same is deemed necessary.

In the instant arrangement it is assumed that the vehicle includes an automatic transmission (A/T) which includes its own self-contained autonomous control system—such as a hydraulic spool valve network which is basically responsive to engine load and vehicle speed signals.

However, in the instance a manual transmission (MT) is employed, actuators or servo devices which operate the clutch and move the shift lever are necessary and would be incorporated in this section of the system. Under such conditions it may be necesary to provide an engine load sensor which can be used in connection with the vehicle speed sensor 714 provided in the vehicle speed control section 700. However, as such controls are well known in the art of automotive transmissions no further explantion of these types of arrangement will be given for brevity.

The navigation section 400 includes a memory 401 (e.g. ROM) in which map data is stored and a data access section 403 which selectively access the memory in accordance with commands inputted via a bus interconnecting it and a central control section 503 of the control section 500. With the provision of this section the vehicle is able to maintain a fix on its own position and facilitate the confirmation and use of the global data (X, Y) which is developed, for the purposes of navigating the vehicle to a predetermined destination or over a given course. Although not shown, it is within the scope of the present invention that section be provide with or connected to a transceiver via which data relating the instant vehicle position can be received from a suitable beacon or becons.

With this arrangement the system is able to plot a course which will bring the vehicle to a predetermined position or work place which has been nominated by data input by the man-machine interface 600 to the central control section 503.

The central control section functions to plan the operation of the vehicle based on the the various data inputs and to determine based on the commands received from the man-machine interface 600 drive the vehicle in place of a human operator in manner to complete requisite tasks. This section further functions to produce correction data based on the global data and to use this when considering the content of the local data.

Subsequently the control section produces a plan which results in commands which selectively determine if the vehicle should be steered to the left or right and by how much, if the speed should be increased, decreased or the vehicle brought to a hault. For example, if the vehicle is deemed to be approaching an intersection, the vehicle speed can be reduced to a level deemed safe for the instant situation. Particularly when traversing an intersection, data from the obstacle avoidance control section 501 is given a large amount of weight along with the data input from sections 215 and 217.

With the instant invention the actuator control is adapted to be "fuzzy". That is to say, the control is adapted to follow an "if . . . then . . ." production rule and thus enable a control which is in essence similar to that provided by a human operator.

The man-machine interface 600 includes a keyboard and CRT display arrangement via which data can be manually inputted and visually checked. However, in lieu of or in place of this combination, it is possible to use a digitizer unit 605 (in place of the keyboard) and/or provide this section with a microphone and speech recognition type system 607 whereby spoken commands can be recognized and subsequently transmitted to the central control section 503. With this latter mentioned provision it is possible for a supervisor to "speak" to the machine and give it suitable verbal orders. Of course it is within the scope of the present invention that these orders can be transmitted by transcievers such as mobile telephones, walkie talkies or the like, from a distance in addition to or in lieu of the commands being issued in an audible range of the vehicle.

The vehicle speed control section 700 includes an emergency brake actuator 701 which is controlled by a control unit or section 703. This section 703 is arranged to receive emergency braking data and command inputs from an antenna 705 via a reciever 707, an emergency brake switch 709 and an upper speed limiter circuit 711. The latter mentioned circuit is responsive to a variable resistor or the like device which can be set in a manner to determine the absolute upper speed. The vehicle speed sensor 714 is operatively connected to the upper speed limiter circuit 711.

Data from the upper speed limiter is bused to a steering control section 505 of the central control section 500 and from there to the actuator control section 300 and to the central control section 503.

The vehicle is provided with a data recording section 800.

This section functions in manner similar to an aircraft "flight recorder" and for this reason will be referred to as a flight recorder hereinafter. This section includes a data recording unit which receives data from the steering control section 505 and from a G sensor unit. This latter mentioned device renders it possible to monitor the accelerations that the vehicle is subject and to record these along with the bused data in a manner which enables a meaningful record to be established.

With the above described arrangement, the image processing section recieves data from the camers 101 and 103 and develops an image from which the distance o to the road centerline and the edge of the road are derivable. In this instance it will be assumed that the vehicle is arranged to travel on the left hand side of the road and thus develops a value XL indicative of the distance to the edge of the road and a value XR indicative of the distance to the centerline. The change in direction of the center line is also derived from the image and used to determined the amount of curvature (theta) in the road. The distance to the next intersection Y is determined by noting the disappearance of the center line. All of this data is grouped as "local data" in local position determining unit 107.

At the same time the wheel speeds of the left and right rear wheels of the vehicle are detected by the wheels speed sensors 211 and 213. This data is periodically checked and the difference between the two values noted. This data is grouped as "global data".

Even though the above local and global data should indicate exactly the same positional results, it happens in actual practice that a number of discrepencies occur between the two data groups. For example, the development of the local data by can influenced by noise which disturbs the image created in the image computing system 105 to the degree that some of the measurements which are taken from the image are rendered slightly erroneous. On the other hand, if the vehicle proceeds over a long distance errors, due to slight changes in the diameter of the wheels (for example due to temperature related changes in tire pressure—slight differences in the left and right hand rear tires etc.) can accumlate. Thus, neither can be relied upon to perfectly reflect the actual situation.

For this reason the present embodiment compares the local and global data and accepts only results which fall within a predetermined deviation range and which can be therefore assumed to be essentially correct. Only data which passes this screening the instant position of the vehicle is permitted to be used to determine the instant vehicle status.

Figure 2:
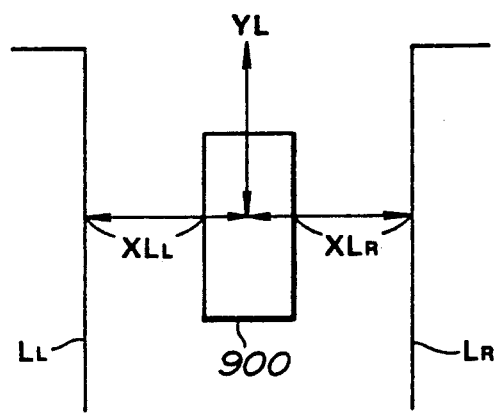
FIGS. 2 and 3 are diagrams showing the directions in which local and global vehicle position data are taken.
Figure 3:
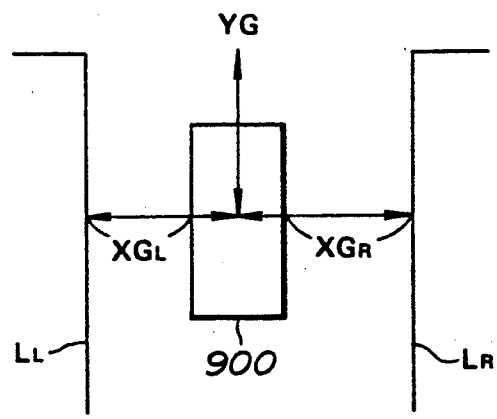

FIGS. 2 and 3 are diagrams which respectively show corresponding local and global parameters. The values XLR, XLL and YL denote local data as derived in local vehicle position determining unit 107 using the data produced by the image processing section. On the other hand, the values XGR, XGL and YG are derived in section 200. In FIGS. 2 and 3 LL denote the side of the road and LR the center line. Accordingly the position of the center of the vehicle 900 with respect to the lateral dimensions of the road or lane along with it is travelling is indicated by the values XLL & XLR and XGL & XGR. The distance to the next intersection is indicated by YL and YG. However, as mentioned above abberation tends to occur which causes a difference to occur between the coresponding parameter values.

Accordingly, the above mentioned data is screened in the following manner:

$$|XLR - XGR| < \epsilon R (alpha)$$

$$|XLL - XGL| < \epsilon L (alpha)$$

$$|YL - YG| < \epsilon Y (alpha)$$

The above listed data is only accepted if the difference between the local and global data falls within the respective range. For example, if $|XLR - XLG|$ is outside the predetermined allowable range of epsilon R (alpha) then it is assumed that at least one of the values XLR and XGR is possibly erroneous and the data is deemed unacceptable.

It will be noted that the value of alpha varies for each of the above listed parameters depending on the degreee of reliability of the devices which are involved in the derivation of each of the parameters. For example, each alpha value is dervived using alpha g (reliability factor for the global data) and alpha 1 (reliability factor for local data). These factors are in turn respectively determined usng the maximum, minimum and average corresponding values. Viz., min (alpha 1, alpha g)

alpha = (alpha 1 + alpha g)/2 max (alpha 1, alpha g)

Following the above process the following calculations are carried out to determine a steering angle correction value Hi +1:

$$[H]i+1 = [H]i + k1 \cdot \{(XGR-XLR)+(XGL-XLL)\}/2$$

or $$[H]i+1 = [H]i + k2(alpha) \cdot \{(XGR-XLR)+(XGL-XLL)\}/2$$

wherein k1 is a constant and k2(alpha) is a factor which is related to the reliablitity factor alpha.

FIG. 4 shows a flow chart depicting the basic logic used in the instant invention.

As shown, the initial phase of control comes in the derivation of the global and local status and the corresponding reliability degrees (steps 1001 and 1002). At step 1003 the overall reliability degree alpha is determined (in the manner detailed hereinbefore) and at step 1004 the respective permissible ranges within which data will be accepted are calculated.

At step 1005 the global and local data are compared and the differences screened using the ranges determined in the previous step.

If the outcome of the screening indicates that the data is acceptable then the program flows to step 1006 wherein the correction factor [H]i +1 is calculated and subsequently read out in step 1008. However, in the event that the screening conducted in step 1005 indicates an unacceptable situation then the instant steering angle [H]i is maintained by setting the instant value in RAM as the new value of [Hi]+1.

It should be noted that even though the reliability factor alpha for the local data is determined essentially by the reliability of the cameras used. Viz., in this connection the reliability with which the contrast in the lightness and darkness of the image can be interpreted is acceptable in determining this factor. The reliability factors alpha g of the global data depends on the reliability of the wheel speed sensors and the accuracy with which the rotational speed can be determined. However, this factor should be modified in accordance with the condition of the road surface on which the vehicle is running, viz., wet surface, snow, gravel, sand, asphelt. The condition of the road surface has a large influence on the amount of wheel slip that occurs and thus has a large influence on the reliability of the data inputted by the wheel speed sensors. Accordingly, in order to the ascertain the appropriate reliability factor necessary for the control calculations is appropriate to compare the inputs from the wheel sensors with another sensor which senses a parameter which varies with vehicle speed and determine if the correlation is close or not. For example, if the vehicle speed is detected as being low by the the lasar radar 209 or one of the ultrasonic sensors (merely by way of example) while the wheel speed sensors intermittently indicate a high vehicle speed, wheel slip can be assumed to be occuring. Of course the rate of change of the wheel speed can be used to additionally indicate this phenomenon if so desired.

The preceeding description should not be deemed as limiting the scope of the invention. That is to say, as will be fully appreciated by those skilled in the art of automatic control, many variations and changes can be made without departing from the scope of the invention.

What is claimed is:

1. In a method of automatically controlling a vehicle the steps comprising:

producing an image of the road on which the vehicle is running and from which image distance and road curvature data can be measured;
deriving a first set of vehicle positional data from the distance and road curvature data measured from said image;
sensing the rotational characteristics of a vehicle wheel;
deriving a second set of vehicle positional data from the wheel rotational characteristics;
comparing the first and second sets of data and determining if the difference between the two sets fall within a predetermined range; and
rejecting the first and second sets of data if the difference therebetween falls outside the predetermined range.

2. A method of automatically controlling a vehicle as claimed in claim 1 wherein said steps of producing an image of the road on which the vehicle is running and deriving said first set of positional data comprise:
observing the road using first and second cameras;
producing a stere image using the inputs from said first and second cameras;
producing said image of the road form which said distance and road curvature data can be measured;
identifying the side limits of the portion of the road on which the vehicle is running from said image;
establishing the distance of said vehicle from each side limit of the portion of the road on which the vehicle is running and degree of curvature of the road; and
using the distances derived in said step of establishing to compile said first set of vehicle position data.

3. A method as claimed in claim 2 further comprising the step of determining the degree of curvature of the road from the image of the road.

4. A method of automatically controlling a vehicle as claimed in claim 1 wherein said vehicle wheel rotational characteristic sensing step and said step of deriving said second set of vehicle positional data comprise:
measuring the rotational speed of first and second wheels of said vehicle;
determining the vehicle speed, distance traversed and the rate of turning of the vehicle using the rotational speeds of said first and second wheels; and
using the vehicle speed, distance traversed and rate of turning of the vehicle to compile said second set of positional data.

5. A method of automatically controlling a vehicle as claimed in claim 4 further comprising the steps of:
sensing conditions on either side of the vehicle;
determining the distance of the vehicle from the side of the road using the data derived in said condition sensing step;
using this data to compile said second set of positional data.

6. In an automatically controlled vehicle, the arrangement comprising:
means for producing an image of the road on which the vehicle is running and from which distance and road curvature data can be measured;
means for deriving a first set of vehicle positional data from the distance and road curvature data measured from the image;
means for sensing the rotational charcteristics of a vehicle wheel;
means for deriving a second set of positional data from the wheel rotational characteristics; and
means for
(a) comparing the first and second sets of data and determining if the difference between the two sets falls within a predetermined range, and
(b) rejecting the first and second sets of data if the difference therebetween falls outside the predetermined range.

7. An automatically controlled vehicle as claimed in claim 6 wherein said image producing means and said first st of positional data deriving means comprise:
first and second cameras; and
means for
(a) producing a stereo image using the inputs from said first and second cameras;
(b) producing said image of the road on which the vehicle is running and from which distance and road curvature data can be measured;
(c) identifying the side limits of the portion of the road on which the vehicle is running from said image;
(d) establishing the distance of said vehicle from each side limit of the portion of the road on which the vehicle is running and the curvature of the road; and
(e) using the distance and road curvature data derived in said step of establishing, to compile said first set of vehicle position data.

8. An automatically controlled vehicle as claimed in claim 7 wherein said means includes circuitry for determining the degree of curvature of the road from the image of the road.

9. An automatically controlled vehicle as claimed in claim 6 wherein said vehicle wheel rotational characteristic sensing means and said second set of vehicle positional data deriving means comprise:
means for measuring the rotational speed of first and second wheels of said vehicle; and
means for
(a) determining the vehicle speed, distance traversed and the rate of turning of the vehicle using the rotational speeds of said first and second wheels; and
(b) using the vehicle speed, distance traversed and rate of turning of the vehicle to compile said second set of positional data.

10. An automatically controlled vehicle as claimed in claim 9 further comprising:
means for sensing conditions on either side of the vehicle; and
means for
(a) determining the distance of the vehicle from the side of the road using the data derived in said condition sensing means; and
(b) using this data to compile said second set of positional data.

11. In a vehicle
a system for automatically controlling said vehicle, said system comprising:
image proceeding means for observing the road, producing an image of said road, and deriving distance related data from the image;
first positional data determining means for compiling a first set of vehicle positional data;
sensor means for sensing the rotational speed of the first and second road wheels and conditions prevailing on either side of the vehicle, said sensor means including second positional data determining means for compiling a second set of vehicle positional data;

actuator means including a plurality of actuators and a control unit for selectively controlling said actuators for controlling the steering, power generation and braking operations of said vehicle;

man-machine interface means for receiving external commands; and a control means responsive to the first and second data compilations of said first and second positional data determining means, said sensor means, and said man-machine interface means, for selectively controlling said actuator means, said control means including means for (a) comparing the first and second sets of data and determining if the difference between the two sets fall within a predetermined range; and (b) rejecting the first and second sets of data if the difference therebetween falls outside the predetermined range.

12. A vehicle as claimed in claim 11 further comprising:

navigation means including a memory in which map data is stored and excess means for selectively accessing the memory;

said control means being operatively connected with said navigation means to enable a requisite course to be plotted and for the instant position of the vehicle to be identified.

13. A vehicle as claimed in claim 11 wherein said sensor means further comprises a plurality of sensors for examining the areas located on either side and to the rear of the vehicle, and a secondary position detection means for compiling a third set of positional data, said secondary position detection means being connected to said control means to provide data input which can be used in lieu of the data compiled in said first positional data determining means as a failsafe.

14. A vehicle as claimed in claim 13 further comprising a forward direction sensor, said forward direction sensor sensing the presence of an obstacle in the path of said vehicle, said forward direction sensor being operatively connected with said control section through said secondary position detection means.

15. A vehicle as claimed in claim 11 further comprising data recording means for receiving data from said control means and to store the same in a memory, said data recording means further including an accelerometer for determining the G force to which the vehicle is subject.

16. A vehicle as claimed in claim 11 further comprising vehicle speed limiting means comprising:

an emergency brake actuator;

control unit for selectively actuating said emergency brake actuator;

a vehicle speed sensor;

an upper vehicle speed limiting circuit operatively connected between said vehicle speed sensor and said emergency brake actuator;

manually adjustable means for setting the upper speed in said upper speed limiting circuit;

an antenna;

a receiver operatively connected with said antenna, said receiver being connected with said control unit for transferring a command to stop the vehicle received by said antenna to said control circuit.

17. A vehicle as claimed in claim 11 wherein said man-machine interface comprises means responsive to external commands for converting said external commands into a suitable signal for using in said control means.

18. A vehicle as claimed in claim 17, wherein said external command responsive means comprises a keyboard.

19. A vehicle as claimed in claim 17, wherein said external command responsive means comprises a digitizer for converting said external command into a digital signal.

20. A vehicle as claimed in claim 17, wherein said external command responsive means comprises a microphone and a speech recognition system which enables verbal commands to be received and converted into a signal which is applied to said control section.

* * * * *